United States Patent [19]

Kawahara et al.

[11] Patent Number: 5,124,211
[45] Date of Patent: Jun. 23, 1992

[54] DISTRIBUTION OF POWDER FOR MAKING COATED GLASS

[75] Inventors: Hideo Kawahara, Toyonaka; Nobuhiro Sakata, Nishinomiya, both of Japan; Jean-Claude Coulon, Mercurey; Patrick Lovera, Chatenay Malabry, both of France

[73] Assignee: Saint-Gobain Vitrage, Courbevoie, France

[21] Appl. No.: 550,507

[22] Filed: Jul. 10, 1990

Related U.S. Application Data

[62] Division of Ser. No. 519,710, Aug. 2, 1983, Pat. No. 5,004,503.

[30] Foreign Application Priority Data

Aug. 2, 1982 [JP] Japan ................. 57-134859

[51] Int. Cl.⁵ .................................. B32B 17/06
[52] U.S. Cl. .............................. 428/428; 428/432
[58] Field of Search ................. 428/432, 428; 106/287.18, 287.19, 284; 427/110, 160, 165, 168

[56] References Cited

U.S. PATENT DOCUMENTS

| | | | |
|---|---|---|---|
| 2,877,139 | 3/1959 | Hyde et al. | 428/432 |
| 2,999,040 | 9/1961 | Burdick | 428/432 |
| 3,580,519 | 5/1971 | Klein | 241/22 |
| 3,645,778 | 2/1972 | Nesteruk | 428/432 |
| 3,754,989 | 8/1973 | Bockstie, Jr. | 428/432 |
| 5,004,503 | 4/1991 | Kawahara et al. | 428/428 |

FOREIGN PATENT DOCUMENTS

| | | |
|---|---|---|
| 1555348 | 1/1969 | France . |
| 2391966 | 1/1979 | France . |
| 2081136 | 2/1982 | United Kingdom . |

OTHER PUBLICATIONS

Derwent, Japanese Patents Report, vol. T. No. 45, Dec. 12, 1972 and JP-A-47214±8 (Nippon Sheet Glass) Apr. 10, 1972.

Primary Examiner—Ellis P. Robinson
Assistant Examiner—Archene A. Turner
Attorney, Agent, or Firm—Oblon, Spivak, McClelland, Maier & Neustadt

[57] ABSTRACT

A process for the distribution of a powder for coating glass, whereby a regular, homogeneous coating of uniform thickness is formed, wherein the powder is converted into a metal oxide or oxides upon contact with hot glass, which comprises spraying a powder onto said glass, wherein said powder comprises: (a) a composition which is capable of being converted into a metal oxide or oxides upon contact with hot glass, and (b) a water-repellent, anhydrous product having a base of finely-divided silica.

The product with a base of finely-divided silica is added in the amount of about 0.5 to 5%, by weight, based on the total powder weight.

6 Claims, No Drawings

DISTRIBUTION OF POWDER FOR MAKING COATED GLASS

This is a division of application Ser. No. 06/519,710 filed on Aug. 2, 1983, now U.S. Pat No. 5,004,503.

BACKGROUND OF THE INVENTION

1. Field of the Invention

This invention relates to the distribution of powder products and relates more particularly to the coating of glass with a layer of metal oxides obtained by pyrolysis of a powder of organometallic compounds sprayed on the glass at high temperature.

2. Description of the Prior Art

When glass is to be coated with a layer of oxides such as the oxides of Fe, Cr, Co, Ti, Al, Sn or Cu, for reflecting solar heat radiation, tinting, or increasing the hardness of the glass articles, dishes, or bottles, for example, the glass is often sprayed with a solution containing organometallic compounds that can be transformed into metal oxides at high temperature.

However, this process exhibits drawbacks. In particular it produces layers with irregular metal oxides and, moreover, cools the glass too much. This is particularly bothersome for thin glass which can be broken. Such a process also requires the use of solvents that may be harmful, or which are flammable or which are expensive.

To avoid these drawbacks, attempts have been made to spray the glass directly with powdered metal rather than with a solvent containing the metal compounds.

In the attempt to achieve a homogeneous distribution of the sprayed powder over the entire surface of the glass, it is known from Patent EP 6064 that the powder may be distributed on the glass with a device comprising a distribution slot placed over the entire wide width of the glass strip passing under it, with the slot being preceded by a primary slot which is fed powder by a multiplicity of pipes.

The process and device of EP 6064 have made it possible to avoid some of the drawbacks associated with the spraying of a solution and have improved the quality of the coated products so manufactured. However, when it is desired to increase the treatment width, for example, when it is desired to coat glass ribbons 4 m wide, or when it is desired to reduce the delivery of carrier gas to cool the glass less to obtain a still higher pyrolysis efficiency, or when it is desired to obtain even thinner and more homogeneous coatings, new difficulties are encountered. For example, the powder of the organometallic compounds adheres to the walls of the pipes that are carrying it and accumulates on the pipe walls. This can result in altering the delivery of powder and therefore the quality of the coating.

Further, only a relatively slight resistance of the deposited metal oxide layers to chemical agents can be noted, perhaps due to the high traveling speed of the substrates to be coated under the powder distribution slot.

Therefore, a need continues to exist for a process which distributes powders in regular, homogeneous coatings having uniform thickness, which are resistant to chemical attack, such that the devices employed to distribute the powders do not become clogged with the powders as the powders are distributed.

SUMMARY OF THE INVENTION

Accordingly, it is an object of the present invention to provide a process for the distribution of a powder in regular, homogeneous coatings.

It is also an object of the present invention to provide a process for the distribution of a powder in regular, homogeneous coatings wherein the coating so produced is resistant to attack by chemical agents.

Further, it is also an object of this invention to provide a process for the distribution of a powder in regular, homogeneous coatings having uniform thickness.

Moreover, it is a particular object of the present invention to provide a process for the distribution of a powder in regular, homogeneous coatings on glass, wherein a coating of uniform thickness is attained, and wherein the delivery of carrier gas for the powder to the glass surface is reduced, to allow less cooling of the glass, thereby improving the pyrolysis efficiency of the glass.

According to the present invention, the foregoing and other objects are attained by providing a process for the distribution of a powder for coating glass, whereby a regular, homogeneous coating of uniform thickness is formed, wherein the powder is converted into a metal oxide or oxides upon contact with hot glass, which entails spraying a powder onto the glass, wherein the powder contains (a) a composition which is capable of being converted into a metal oxide or oxides upon contact with hot glass, and (b) a water-repellent, anhydrous product having a base of finely-divided silica.

DETAILED DESCRIPTION OF THE PREFERRED EMBODIMENTS

This invention contemplates increasing the utility of the coating process using powders, while avoiding the operating difficulties mentioned above. Moreover, it also contemplates providing coated substrates exhibiting good properties, in particular, substrates having regular and homogeneous coatings and resistance to attack by chemical agents.

For this purpose, the present invention proposes to add water-repellent, finely divided silica-base products to the powder that is to be sprayed on the glass.

These products should contain a high percentage of silica, equal to or greater than 90%, preferably at least on the order of 98% with no or only slight impurities that can pollute the coating film.

These products are advantageously formed of particles whose average size is on the order of 1/1000 of the size of the grains of powder to be sprayed on the glass.

Thus, for powders from a micron to some dozen microns of average size, products having particles on the order of 7 to 20 nanometers, preferably 10 to 15 nanometers (nm), in average size are suitable. More precisely, the product sold under the commercial name AEROSIL R 972 containing from more than 98.3% cf $SiO_2$, having particles of an average size of 16 nm, an apparent density of 50 g/l and a given surface according to the standardized measurement B.E.T. of $120+30$ $m^2/g$ is suitable.

The silica-base products sold under the tradenames CABOSIL and TIXOSIL are also suitable for use according to the present invention.

The powder which is to be sprayed on the glass contains (a) a composition which is capable of being converted into a metal oxide or oxides upon contact with hot glass, and (b) a water-repellent, anhydrous product having a base of finely-divided silica.

The composition (a) which is capable of being converted into a metal oxide or oxides upon contact with hot glass may be organometallics such as dibutyltin difluoride, dibutyltin oxide, acetylacetonates of various metals such as Fe, Cr, Co, Ti, Al, Sn, Cu or In or a mixture thereof. Other compounds of the metals Fe, Cr, In, Co, Ti, Al, Sn, Cu or mixtures thereof, which similarly are converted to a metal oxide or oxides upon contact with hot glass may also be used.

The water repellent, anhydrous product having a base of finely-divided silica is present in the amount of 0.5 to 5% by weight, based on the total powder weight. It is preferable, however, that the product having a base of finely-divided silica is present in the amount of 1 to 2% by weight, based on the total powder weight. In large proportions, an unfavorable effect is noted with respect to the regularity and homogeneity of the powder distribution. Additionally, percentages of the finely-divided silica base product in excess of 5% result in a substantial change in the optical properties, for example, of the coating produced.

The present invention will be further illustrated by certain examples and references which are provided for purposes of illustration only and are not intended to limit the present invention.

Tests were run with various powders, to determine the percent by weight of the silica-base products that should be added to the powders to prevent clogging of the devices and to regulate powder distribution, without, however altering the properties, particularly the electrical and optical properties and resistance to attack by chemical agents, of the deposited layers.

EXAMPLE 1

Testing was conducted on powder mixtures of 70% iron triacetylacetonate and 30% chromium triacetylacetonate having no "Aerosil" added, and on the same mixture of iron and chromium triacetylacetonates but with 0.5, 1.0, 1.5, 2.5 and 10% by weight of added "Aerosil".

For this purpose, a mixture of iron triacetylacetonate and chromium triacetylacetonate, mixed in the proportion of 70:30, respectively, was dehydrated for 24 hours at 60° C. whereby the water content decreased to 0.5%. This mixture was then crushed in a grinder so that the crushed powder had a granulometry of 3 to 25 microns. An average grain diameter of 7 to 8 microns was selected for testing.

Seven identical samples of this mixture were prepared and to these were added the amounts of "Aerosil R 972' listed above, i.e., 0, 0.5, 1.0, 1.5, 2.0, 5.0 and 10.0% by weight. Each sample was mixed for three minutes and then each of the seven samples was then subjected to testing with the device shown in described herein.

This device comprises a hopper provided at its lower end with an endless screw distribution system, an iron plate sloped 60° and placed at the foot of plate.

Each of the samples, weighing 10 grams and introduced in into the hopper one after the other, was distributed onto the plate and the powder recovered in the container was, weighed; the difference between the amount of powder introduced into the hopper and the amount of powder recovered gave an indication of the ability of the powder to adhere to the plate, and therefore its lack of ability to flow. In this figure, the amount of powder that remained the A considerable drop in the adherence of the powder to the was noticed when the percentage of "Aerosil" increased from 0 to 2%, then after 2% of addition, the adherence still decreased slightly to an addition of 5%, then it remained stable.

This test measured the ability of the powder to adhere to the pipes and, consequently, its inability to be distributed by powder distribution installations.

The different powder mixtures produced in Example 1 were then utilized in the manufacture of coated substrates in Example 2.

EXAMPLE 2

Samples of the same iron triacetylacetonate and chromium triacetylacetonate were used, to which 0%, 0.5%, 1% and 2%, respectively, of "Aerosil" were added to test the coatings obtained from these various samples for resistance to attack by chemical agents.

The powder of the four samples was successively sprayed with a gun on the surface of glass plates 5 mm thick and 150 mm×150 mm in size, brought to a temperature of 575° to 580° C. The air pressure entraining the powder in the gun was 4.5 kg/cm$^2$ and the delivery was 80 1/min. In all cases, the spraying lasted 2 seconds. Thus, glass regularly coated with a layer of Fe and Cr oxides was obtained. The samples were cut into 50 mm×25 mm test pieces which were immersed in baths of hydrochloric acid (HCl) and sodium hydroxide (NaOH) of a normality of 1. A count was made of the number of days at the end of which a defect of the pinhole type, fading, detachment occurred on the coatings.

The results are given in Table 1.

TABLE 1

| Sample No. | Amount (%) of Aerosil ($SiO_2$) in powder to be sprayed | Number of days of endurance: resistance to acid | Number of days of endurance: resistance to sodium hydroxide |
|---|---|---|---|
| 1 | 0% | 8 hours | 9 days |
| 2 | 0% | 8 hours | 9 days |
| 3 | 0% | 8 hours | 12 days |
| 4 | 0.5% | 1 day | 14 days |
| 5 | 0.5% | 1 day | 12 days |
| 6 | 0.5% | 3 days | 19 days |
| 4 | 1% | 3 days | 27 days |
| 5 | 1% | 2 days | 17 days |
| 6 | 2% | 5 days | 29 days |
| 7 | 2% | 11 days | 19 days |
| 8 | 2% | 9 days | 17 days |

Inspection of Table 1 indicates that the resistance of the coatings to attack by acids or bases increases with increased content of "Aerosil" in the coating.

EXAMPLE 3

Tests were also run on mixtures of powder of 50% iron triacetylacetone and 50% chromium triacetylacetone, in a stage without addition of finely divided silica, in a second state with addition of 1% silica, then in a third stage with addition of a percentage of silica greater than 5%.

It was found that the distribution of the powder mixture is greatly improved when 1% of finely divided silica has been added; the powder delivery is increased and the regularity of the distribution is improved.

On the other hand, it was found that for additions of a percentage greater than 5%, there is no additional improvement on the distribution level, but that the properties of the coatings obtained on the glass, particularly the optical and electrical properties, are changed.

The same findings were made with dibutyltin difluoride, dibutyltin oxide, acetylacetonates of various metals (Fe, Cr, Co, Ti, Al, Sn, Cu, In) of mixtures of various metal acetylacetonates (for example, Fe, Cr, $Co^{II}$) and of various other compounds of the metals Fe, Cr, In, Co, Ti, Al, Sn, Cu or mixtures of these powders.

Finally, it was found that the improvement made by addition of finely divided silica is slight when the amount added is 0.5%, and it is maximal for doses of 1 to 2%, and in particular 2%. Percentages higher than 5% result in an alteration of the coating properties.

Addition of finely divided, anhydrous, water-repellent silica therefore makes it possible to improve the distribution of the powder. It promotes the use of longer distribution slots while preserving the regularity and homogeneity of the distribution.

With the homogeneity and regularity of the powder distribution being improved, it is now easier to make coatings on glass, particularly coatings having electrical properties, and of these coatings, antistatic coatings, in particular. The difficulty in obtaining a continuity of the coating, without localized excess thicknesses that result in consumption of powder and alter the optical properties, particularly transmission, is known. Because of the surprisingly improved homogeneity and regularity of powder distribution, it is possible to obtain layers of more regular coating, or more uniform thickness. This is particularly important in the case of antistatic layers when a continuity of the coating is desired, concurrently with a slight thickness to attain electric resistances on the order of 100,000 ohms per square.

The homogeneity and regularity of powder distribution is also reflected by a more beautiful appearance of the coatings, without speckling and without causing irritation phenomena.

It was also found that resistance of the coatings to abrasion is more homogeneous and that resistance to attack by chemical agents is enhanced.

It is also known that it is very important to control the granulometry of the sprayed powders to avoid their toxicity with respect to the technicians making the coated glasses. Due to the addition of finely divided, water-repellent silica, reagglomeration of the powders is avoided, and a constant granulometry is obtained which is selected to avoid any toxicity.

With the powder distribution improved, it is possible to reduce the delivery of carrier gas to the glass, thereby reducing the cooling of the glass. This cooling of the glass is caused by spraying of powder in suspension in the carrier gas, and the avoidance or minimization thereof is an advantage when tempered coated glasses are to be produced. It is known that it is difficult to obtain pyrolysis of the powder of an organometallic compound sprayed on glass with a satisfactory pyrolysis efficiency without bringing the glass to a temperature above about 520° C. in order to prevent the disappearance of surface compression stresses of the glass, resulting from tempering. With the glass, therefore, initially being relatively cold, an effort is made to lower its temperature as little as possible by spraying. The use of powders, particularly dibutyltin oxide, described in French Patent Publication 2,391,966, illustrated some progress with respect to the use of metal compounds in solution. However, it is now possible to reduce delivery of the carrier gas acting as a vehicle for the powder, due to the addition of water-repellent, finely divided silica. This constitutes a significant improvement over known coating processes and now makes it possible to cool the glass even less and thereby improve the pyrolysis efficiency.

The additives introduced in the powders according to the present invention have a favorable effect on the coated powders with the preferred proportions being between 0.5 and 5% and preferably between 1 and 2%. In larger proportions, an unfavorable effect is noted with respect to the regularity and homogeneity of the distribution of the powders, and also with respect to the contamination of the coatings, with the optical properties, in particular, being disturbed.

To make possible a good covering of the powder grains by particles of finely divided water-repellent silica, the powder is added in increasing fractions in a container or is mixed with all the finely divided silica that is to be incorporated.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A coated glass with enhanced resistance to attack by chemical agents, and having a regular, homogeneous coating of uniform thickness, which is produced by a process comprising spraying a powder mixture onto hot glass, said powder mixture comprising:

a) a composition which comprises dibutyltin difluoride, dibutyltin oxide, the acetylacetonates of Fe, Cr, Co, Ti, Al, Sn, Cu or In, or a mixture thereof, or other compound of the metals Fe, Cr, In, Co, Ti, Al, Sn or Cu or a mixture thereof, which are capable of being converted into a metal oxide or oxides upon contact with hot glass, and b) a water-repellant anhydrous product having a base of finely-divided silica, wherein the proportion of product (b) added is between about 0.5 to 5%, based on the total weight of the powder, and further wherein the average granulometry of the composition (a) is in the range of one to several dozen microns, and the average granulometry of the product b) is in the range of 7 to 20 nanometers.

2. The coated glass of claim 1, wherein said coating is an antistatic coating having an electric resistance of approximately 100,000 ohms per square.

3. The coated glass of claim 1, wherein the average granulometry of the product (b) is in the range of 10 to 15 nanometers.

4. The coated glass of claim 1, wherein the product (b) is finely-divided silica containing at least 98% silica.

5. The coated glass of claim 1, wherein the proportion of product (b) added is between about 1 and 2%, based on the total weight of the powder.

6. The coated glass of claim 1, wherein the composition (a) is dibutyltin difluoride, and product (b) is a finely-divided, water-repellent silica, wherein the water-repellent silica comprises 2% by weight of the total powder weight.

* * * * *